United States Patent [19]

Sunagawa

[11] 4,236,144
[45] Nov. 25, 1980

[54] INSPECTION SYSTEM FOR A GROUP OF TANKS

[75] Inventor: Yoshihiko Sunagawa, Kanagawa, Japan

[73] Assignee: Tokyo Keiso Kabushiki Kaisha, Tokyo, Japan

[21] Appl. No.: 968,699

[22] Filed: Dec. 12, 1978

[30] Foreign Application Priority Data

Dec. 14, 1977 [JP] Japan ................................ 52-150034

[51] Int. Cl.³ ........................ G08C 19/16; G08B 21/00
[52] U.S. Cl. .................................. 340/870.18; 73/353; 73/362 AR; 340/623; 340/870.09; 340/870.11; 340/870.19
[58] Field of Search .................... 340/207 R, 183, 181, 340/188 R, 204, 203, 206, 182, 623, 595, 584, 347 M; 73/344, 353, 362 AR

[56] References Cited

U.S. PATENT DOCUMENTS

| | | | |
|---|---|---|---|
| 2,677,276 | 5/1954 | Schmidt | 73/353 |
| 3,377,585 | 4/1968 | Magnin | 340/183 |
| 3,793,636 | 2/1974 | Clark et al. | 340/207 R |
| 4,011,551 | 3/1977 | Adler | 340/207 R |
| 4,027,301 | 5/1977 | Mayer | 340/183 |

Primary Examiner—John W. Caldwell, Sr.
Assistant Examiner—James J. Groody
Attorney, Agent, or Firm—Frishauf, Holtz, Goodman & Woodward

[57] ABSTRACT

An inspection system for a group of tanks, comprises a generator at each tank in which the temperature and the level of the liquid contained in each tank are converted into series data digital signals and start mark signals; and the series data signals are synchronized with clock signals and are transmitted to a receiver. The receiver includes a selector and pulse discriminator for selecting and detecting the start mark signals from a selected generator out of the received series data signals in the receiver. Clock signals are synchronized with the clock signals of the generator side by using the start mark signals; the received and selected series data signals are converted into parallel data signals and the content of the converted parallel data signals is displayed by an indicator to indicate the temperature and level of the liquid in the selected tank.

9 Claims, 5 Drawing Figures

INSPECTION SYSTEM FOR A GROUP OF TANKS

BACKGROUND OF THE INVENTION

In a tankyard where a plurality of tanks for storing liquid such as petroleum or the like are installed, it is necessary to monitor the liquid level during the operation of pouring the liquid into each tank or of allowing the liquid to flow out. In order to determine the net quantity of the liquid within the tank, it is also necessary to detect the liquid temperature and to convert such temperature into a compensation value based on a standard temperature, in addition to the detection of the liquid level, since the liquid volume within the tank varies with changes in temperature. Monitoring of the temperature and the level of the liquid contained in a number of tanks could be attained by installing a measuring instrument in each tank and by having a man to go to each tank for inspection. Such an inspection method, however, will require laborious work and hence not be efficient. It will thus be necessary to provide a system by means of which the liquid volume in each tank can be centrally monitored and controlled.

OBJECTS OF THE INVENTION

A principal object of the present invention is to provide an inspection system by means of which the temperature and the level of the liquid contained in each tank can be measured in order to remotely and collectively determine the net quantity of the liquid contained in all of the tanks.

A further object of the present invention is to provide an economical inspection system with a minimized number of signal wires adapted to transmit the signals from measuring instruments installed in each tank to a receiver.

A further object of the present invention is to provide an inspection system employing a signal transmitting-/receiving system, which does not require a control wire to synchronize the operation between a generator and a receiver.

DESCRIPTION OF THE PREFERRED EMBODIMENT

Figure 1:
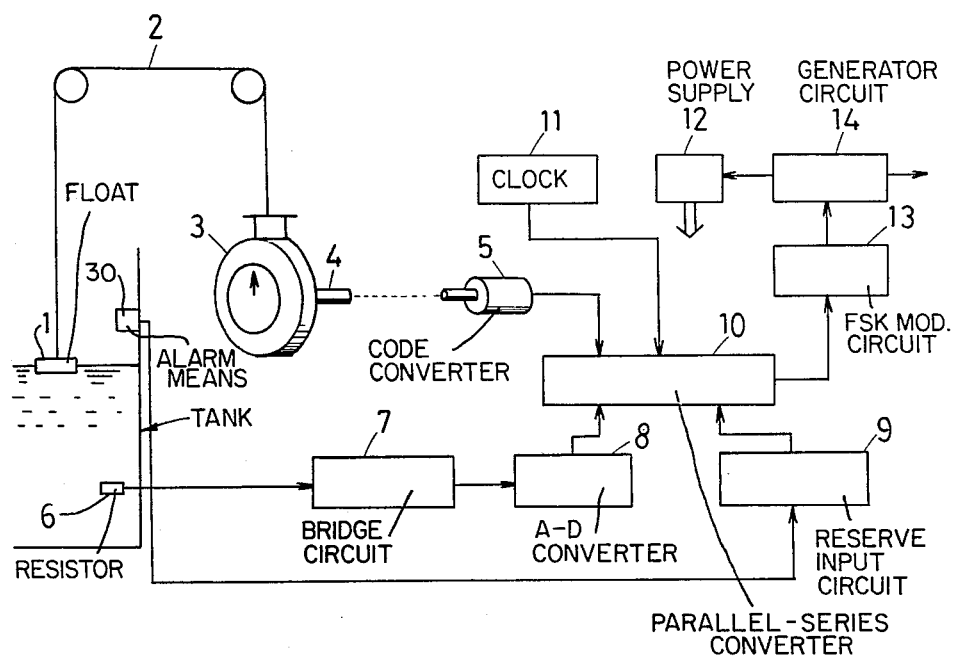
FIG. 1 is a block diagram showing one embodiment of a signal generator according to the present invention.

Referring to FIG. 1, a float 1 in a liquid containing tank is connected to an elongated tape 2 which transmits the movement of the float 1 responsive to changes in the liquid level to a liquid level gauge 3. The liquid level gauge 3 is designed to display by means of a pointer the liquid level and to take out by means of an output shaft 4 the value of a change in the liquid level as an angular rotation of the shaft 4. Rotational movement of the output shaft 4 is converted into a digital code by a rotation angle code converter 5.

A temperature measuring resistor 6 located in the liquid will, in association with a measuring bridge circuit 7, convert the temperature of the liquid within the tank into an electrical quantity (voltage etc.). Such electrical quantity will further be converted by means of an A-D converter 8 into a digital code.

A reserve input circuit 9 is connected to an alarm device for leakage of liquid, an alarm device for watching maximum liquid level or the like. An alarm means 30 for detecting maximum liquid level is shown in FIG. 1.

Figure 2:
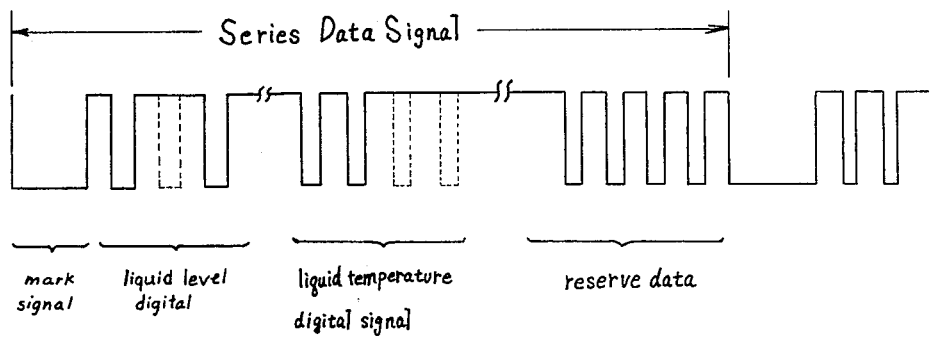
FIG. 2 is a wave form chart showing one embodiment of an output signal in the signal generator of FIG. 1.

The output of the code converter 5, the A-D converter 8 and the reserve input circuit 9 are combined into a series data signal by means of a parallel-series converter 10, the series data signal being shown in FIG. 2.

Referring to FIG. 2, a "mark signal" is provided at the beginning of the series data signal and is of sufficient width in comparison with other data signals so as to be easily discriminated.

As a "liquid level signal", BCD or other codes are employed. The code is designed such that when the liquid level is low "1" appears, while when the liquid level is high "0" appears. In the above embodiment, the first code indicates "1", the second code "0" and the third "1". Similarly, the temperature data and the reserve data will be converted into series codes.

A clock circuit 11 comprising a quartz oscillator or the like which acts as a standard oscillator is coupled to parallel-series converter 10 to determine the timing of signal conversions in converter 10. A power-supply circuit 12 provides electric power for all of the circuits.

The series pulse signal converted from parallel pulse signals in converter 10 is converted into two frequencies according to whether the potential of the pulse is high or low (205 KHZ in case of high level and 200 KHZ in case of low level). An FSK modulation circuit 13 is coupled to converter 10 to receive the series pulse signal and the output thereof is coupled to a generating or transmitting circuit 14 and then to a receiver (FIG. 3) via a power source line (i.e., two wires).

Figure 3:
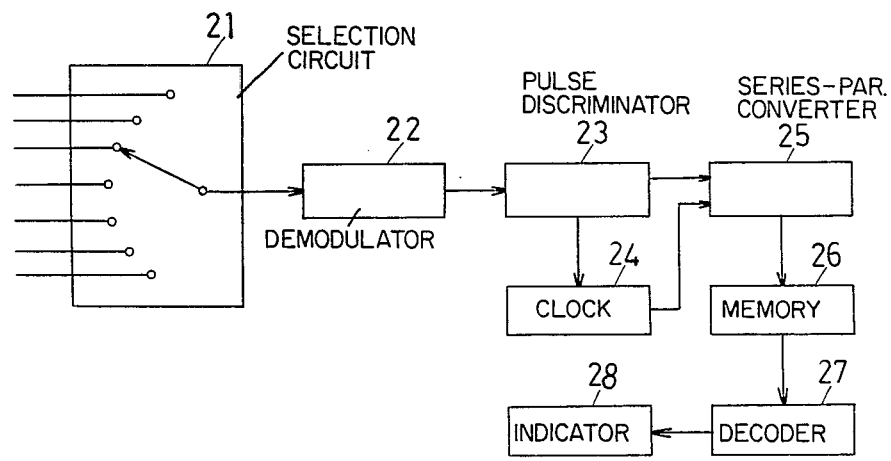
FIG. 3 is a block diagram showing one embodiment of a receiver according to the present invention.

Referring to FIG. 3, in the receiver, there is installed a selective circuit 21 (which includes a selection switch) for selecting a tank required to be inspected from among a plurality of tanks and to connect a power source line thereof.

When the desired generator associated with a particular selected tank is selected by the selection circuit 21, the generator will be energized to transmit repeatedly the FSK modulation signal having a wave form as shown in FIG. 2.

Figure 4:
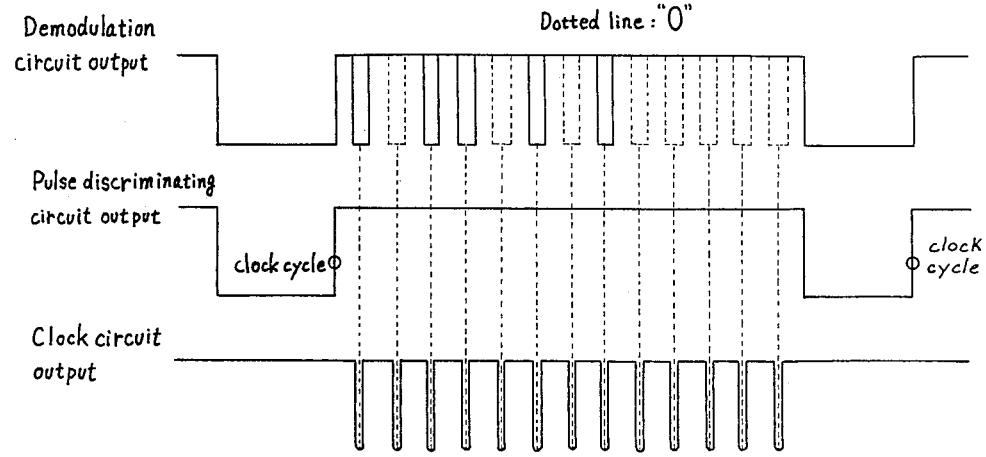
FIG. 4 is a wave form chart showing an output coming from each portion of the receiver of FIG. 3.

In this instance, it is to be noted that the contents of the data to be transmitted will vary in accordance with the change of data during the transmission thereof. The received FSK modulation signal will be demodulated by means of a demodulation circuit 22 into a pulse wave form as shown in FIG. 4.

Figure 5:
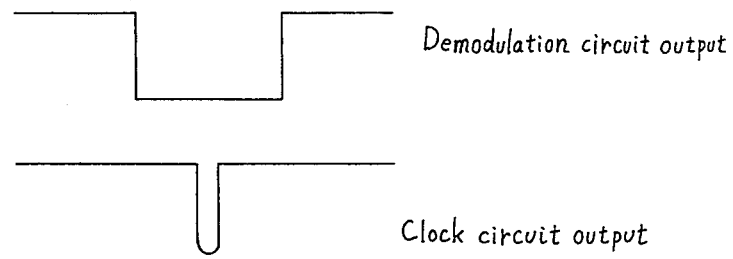
FIG. 5 is a wave form chart showing relationship of the output timing between the demodulation circuit and the clock circuit both included in the receiver shown in FIG. 3.

A mark signal will be detected by a pulse discriminating circuit 23 and the clock circuit 24 of the receiver will be synchronized through the end (trailing edge) of the mark signal detected, whereby the clock 11 of the generator and the clock 24 of the receiver will be synchronized with sufficient accuracy and within a short period of time. FIG. 5 shows the relationship of the timing between the demodulator 22 and the clock circuit 24.

After inspection as to whether there coexists a code signal as well as a clock signal and when found to be synchronized, the received series code signal is converted into a parallel code signal by means of a series-parallel conversion circuit 25. The parallel signal will repeatedly be memorized by a memory circuit 26 each time the mark pulse appears (i.e. in each data sampling cycle). The output of the memory circuit 26 will be converted into a decimal number representing the level data and temperature data by means of a decoder circuit 27. The level data and the temperature data will be displayed in decimal numbers by an indicator 28.

Although not shown in the drawings, the data are divided into parity check bits with a few bit intervals therebetween. After the parity has been checked and when the data are found to be "correct", they will be memorized by the memory circuit; and when the data are found to be in "error", they will consecutively be compared with each parity data item until coinciding data to be memorized are found. These operations can be carried out by means of an additional circuit to be optionally employed.

It should be understood that the foregoing relates to only a preferred embodiment of the invention, and that it is intended to cover all changes and modifications of the example of the invention herein chosen for purpose of the disclosure, which does not constitute departures from the spirit and scope of the invention.

What is claimd is:

1. An inspection system for a plurality of liquid containing tanks comprising:

a generator means at each of said tanks, each generator means including measuring means for measuring the temperature and the level of the liquid in a tank; converter means coupled to said measuring means for converting output signals from said measuring means into parallel digital signals; parallel-series conversion means coupled to said converter means for converting parallel digital signals from said converter means into series digital data signals and for adding a mark signal to said series digital data signals; clock signal generating means coupled to said parallel-series conversion means for generating a clock signal to control the output timing of the series digital data signals formed by said parallel-series conversion means; and means for transmitting the series digital data signals produced by said parallel-series conversion means, said series digital data signals representing the level and temperature of the liquid in the respective tank; and a receiver means for receiving said signals transmitted by said generator means, said receiver means including selection means for selecting signals generated by a selected one of said generator means; pulse discriminating means coupled to said selection means for detecting a mark signal from the selected received signals; a further clock signal generating means for providing a clock signal having substantially the same frequency as that of said clock signal generated in said selected generator means after detection of said mark signal to provide synchronization between the receiver means and the received signals; series-parallel conversion means coupled to said further clock signal generating means of said receiver means for converting received series data into parallel data; and indicator means coupled to said series-parallel conversion means for displaying outputs of said series-parallel conversion means which correspond to the liquid temperature and liquid level in the tank associated with the selected generator means.

2. The inspection system of claim 1, wherein said converter means of each of said generator means includes means for generating digitally coded signals; and wherein said receiver means further includes decoder means coupled between said series-parallel conversion means and said indicator means.

3. The inspection system of either of claims 1 or 2, wherein the series digital data signals produced by said parallel-series conversion means includes a plurality of code signals, and wherein each of said generator means includes FSK modulation means coupled to the output of said parallel-series conversion means for generating a signal of different frequency in response to lowness or highness of each code signal of output data of said parallel-series conversion means and; said receiver means further includes demodulation means coupled between said selection means sand said pulse discriminating means of said receiver means.

4. The inspection system of either of claims 1 or 2, wherein each of said generator means further includes an alarm means for generating an alarm signal to indicate the upper limit of the liquid level, the output of the alarm means being inputted to said parallel-series conversion means; and a value corresponding to said alarm signal being displayed by said indicator means of said receiver means.

5. The inspection system of claim 1, wherein said transmitting means of each of said generator means comprises at least one respective wire, and wherein said selection means of said receiver means comprises a selection switch for selecting at least one of said at least one wires of the respective generator means.

6. The inspection system of claim 1, wherein said receiver means further includes memory means coupled between said series-parallel conversion means and said indicator means.

7. The inspection system of claim 1, wherein at each generator means said measuring means includes a float means for measuring the level of the liquid in a tank.

8. The inspection system of either of claims 1 or 7, wherein at each of said tanks said measuring means for measuring the temperature of the liquid in the tank comprises a temperature sensitive resistor means in the respective tank, a bridge circuit means coupled to said temperature sensitive resistor means for generating an electrical signal which is a function of the temperature of the liquid in the tank.

9. The inspection system of claim 1 wherein said converter means at each of said generator means comprises an A-D converter.

* * * * *